United States Patent
Wagner et al.

(10) Patent No.: US 6,889,822 B1
(45) Date of Patent: May 10, 2005

(54) ACCUMULATION CONVEYOR

(75) Inventors: Ronald G. Wagner, Mason, OH (US); David M. Trice, Mason, OH (US)

(73) Assignee: Intelligrated, Inc., Mason, OH (US)

( * ) Notice: Subject to any disclaimer, the term of this patent is extended or adjusted under 35 U.S.C. 154(b) by 0 days.

(21) Appl. No.: 10/409,771

(22) Filed: Apr. 8, 2003

Related U.S. Application Data

(60) Provisional application No. 60/371,083, filed on Apr. 8, 2002.

(51) Int. Cl.[7] .............................................. B65G 13/07
(52) U.S. Cl. ..................................................... 198/790
(58) Field of Search ............................ 198/781.09, 790

(56) References Cited

U.S. PATENT DOCUMENTS

| | | |
|---|---|---|
| 790,779 A | 5/1905 | Alvey |
| 883,297 A | 3/1908 | Courtney |
| 958,004 A | 5/1910 | Phelan |
| 1,890,753 A | 12/1932 | Scheurer |
| 2,100,423 A | 11/1937 | Ziegler |
| 2,145,475 A | 1/1939 | Cook |
| 2,834,447 A | 5/1958 | Gmur |
| 3,101,829 A | 8/1963 | Silver |
| 3,532,201 A | 10/1970 | McConnell |
| 4,088,224 A * | 5/1978 | Kittredge ..................... 198/783 |
| 4,293,065 A * | 10/1981 | Dyer et al. ............. 198/781.06 |
| 4,441,607 A * | 4/1984 | Bowman et al. ....... 198/781.06 |
| 5,033,600 A | 7/1991 | Klein |
| 5,070,987 A | 12/1991 | Koltookian |
| 5,086,910 A | 1/1992 | Terpstra |
| 5,213,189 A | 5/1993 | Agnoff |
| 5,375,689 A | 12/1994 | Sapp |
| 5,456,347 A | 10/1995 | Best |
| 5,490,587 A | 2/1996 | Fisher |
| 5,540,323 A * | 7/1996 | Schiesser et al. ...... 198/781.06 |
| 5,562,195 A | 10/1996 | Isaacs |
| 5,642,799 A | 7/1997 | Wassilow |
| 5,901,827 A | 5/1999 | Belz et al. |
| 6,065,588 A * | 5/2000 | Cotter et al. ........... 198/781.06 |
| 6,478,142 B2 * | 11/2002 | Cotter et al. ........... 198/781.09 |

FOREIGN PATENT DOCUMENTS

FR          2 530 590          5/1982

* cited by examiner

Primary Examiner—Joe Dillon, Jr.
(74) Attorney, Agent, or Firm—Frost Brown Todd LLC

(57) ABSTRACT

A accumulation conveyor has discrete zones which may be selectively actuated by pressurizing an interior cavity, urging diaphragms against spreaders which carry two spaced apart frame members. The frame members carry respective axle retainers which support the ends of axles on which pressure rollers are rotatably disposed. The pressure rollers urge the drive belt against the conveyor rollers.

1 Claim, 16 Drawing Sheets

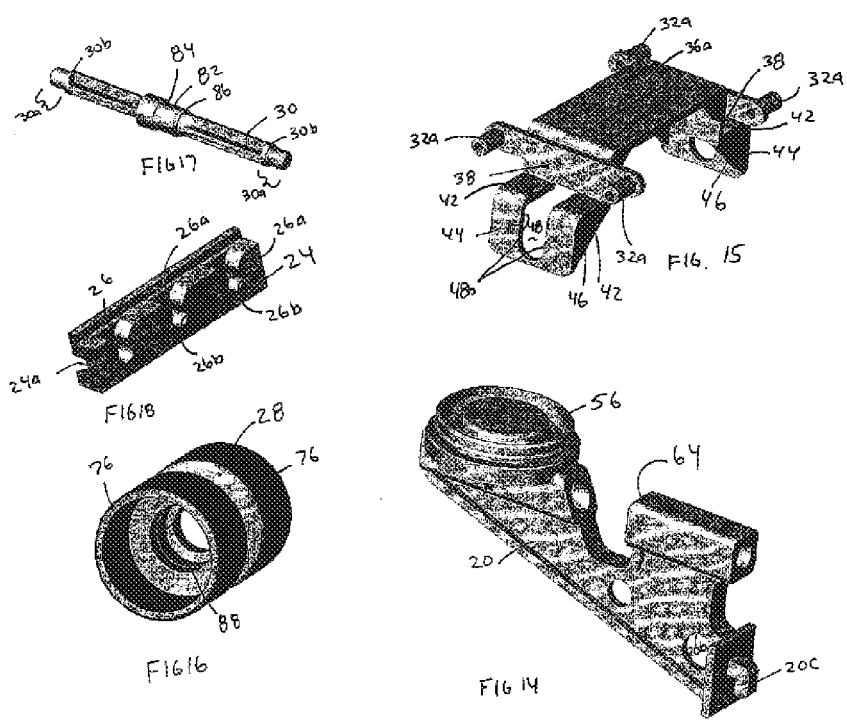

ACCUMULATION CONVEYOR

This application claims priority benefit of and incorporates by reference the disclosure of U.S. provisional patent application No. 60/371,083 for Accumulation Conveyor, filed Apr. 8, 2002.

BACKGROUND OF THE INVENTION

This invention relates to accumulation conveyors, and is specifically directed to an actuator assembly for urging the drive belt into engagement with the conveying rollers of individual zones so as to control the movement of articles located on the upper conveying surface defined by the conveying rollers.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 14 is a top perspective view of the shoe support bracket without the diaphragm and retaining ring.

FIG. 15 is a top perspective view of the shoe spreader.

FIG. 16 is a top perspective view of a pressure roller.

FIG. 17 is a top perspective view of the pressure roller axle.

FIG. 18 is a fragmentary top perspective view of the axle retainer.

Reference will now be made in detail to the present preferred embodiment of the invention, an example of which is illustrated in the accompanying drawings.

DETAILED DESCRIPTION OF AN EMBODIMENT OF THE INVENTION

Figure 1:
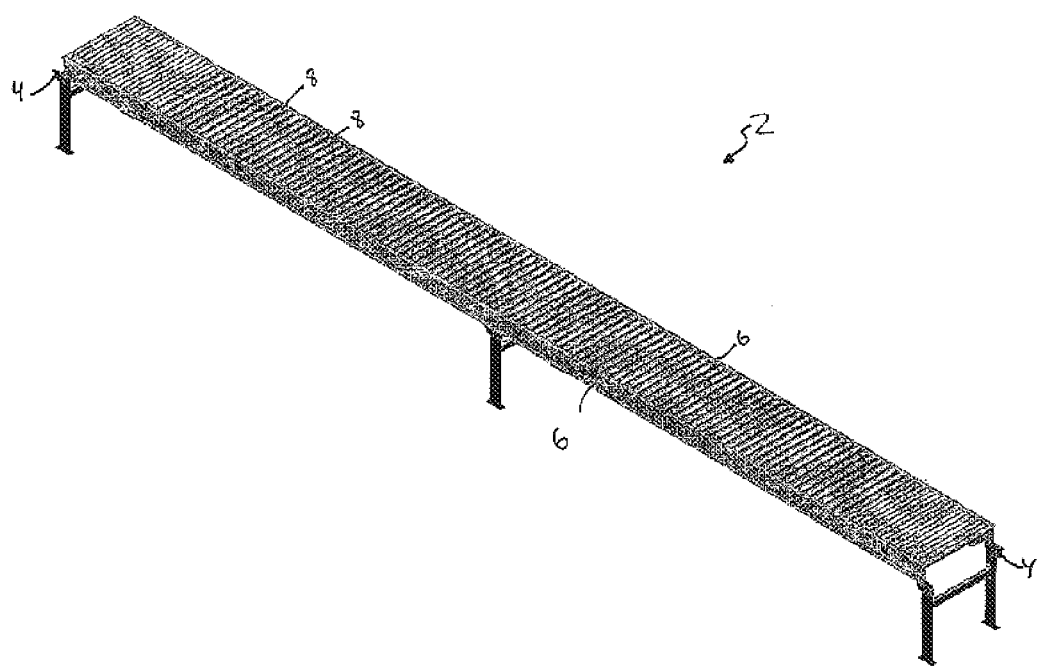
FIG. 1 is a top perspective view of a portion of an accumulation conveyor.

Referring now to the drawings in detail, FIG. 1 is a perspective view of a portion of an accumulation conveyor generally indicated at 2. The portion depicted has a single drive belt (not seen in FIG. 1), driven by a single power source (not shown), which drives all zones within the depicted portion of the accumulation conveyor 2. As can be seen in both FIGS. 1 and 2, there is a bracket 4 at either end which allows multiple sections to be secured together to form a continuous conveyor.

Figure 2:
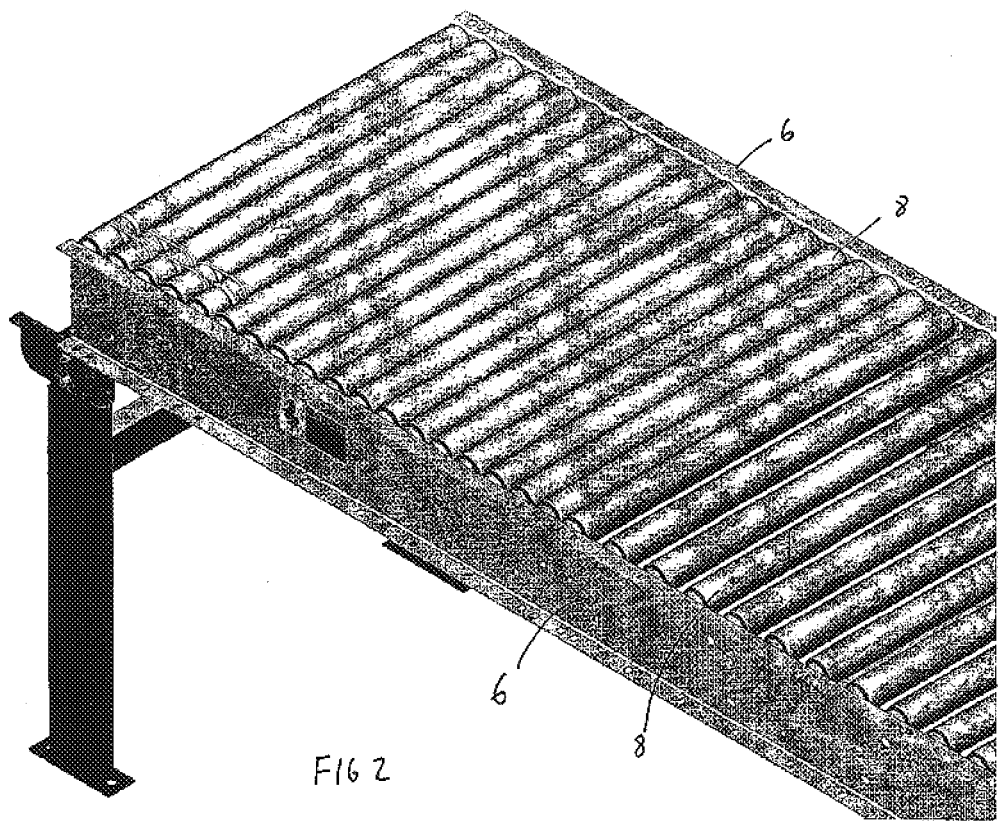
FIG. 2 is a top perspective view of one end of the portion of the accumulation conveyor shown in FIG. 1.

As seen in FIGS. 1 and 2, accumulation conveyor 2 includes two spaced apart frame members or sides 6 which support a plurality of conveyor rollers 8 extending transversely between the frame sides 6. As is well known, the conveyor rollers 8 are supported at each end by a hex shaped axle, each of which engages a complementarily shaped opening formed in the frame sides 6. The conveyor rollers 8 are rotatably supported by the axle, with the shape of the openings in the frame sides 6 preventing rotation of the axle. The upper edge of the conveyor rollers 8 define an upper conveying surface on which articles being transported are located.

Figure 3:
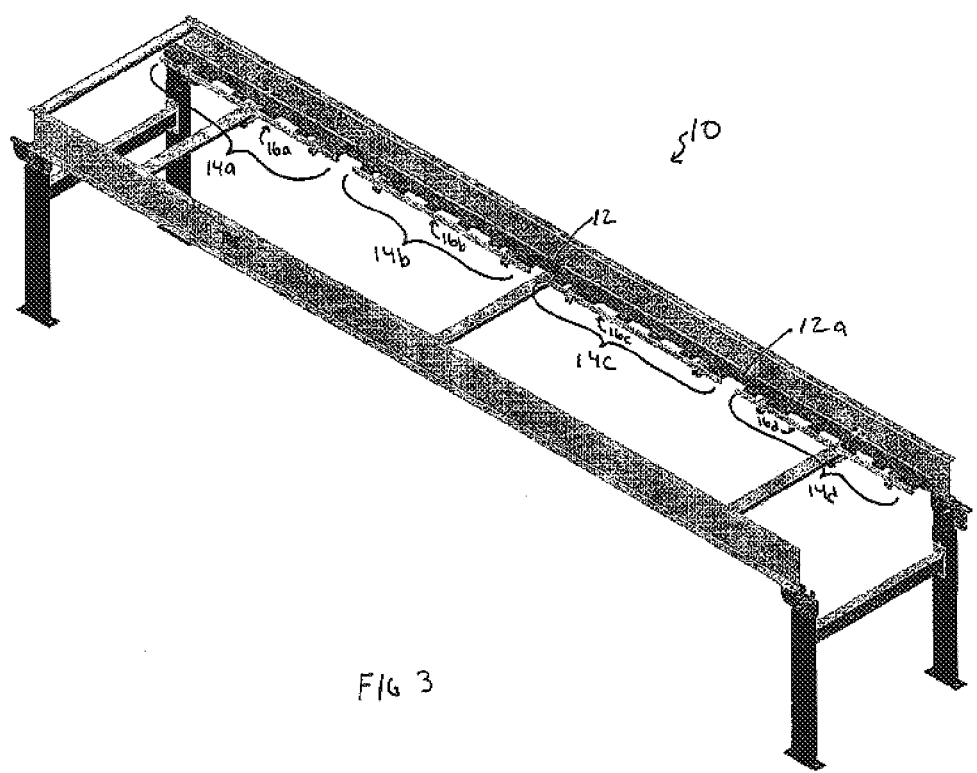
FIG. 3 is a top perspective view of an individual section of the accumulation conveyor shown in FIG. 1, with all but one conveying roller removed.
Figure 4:
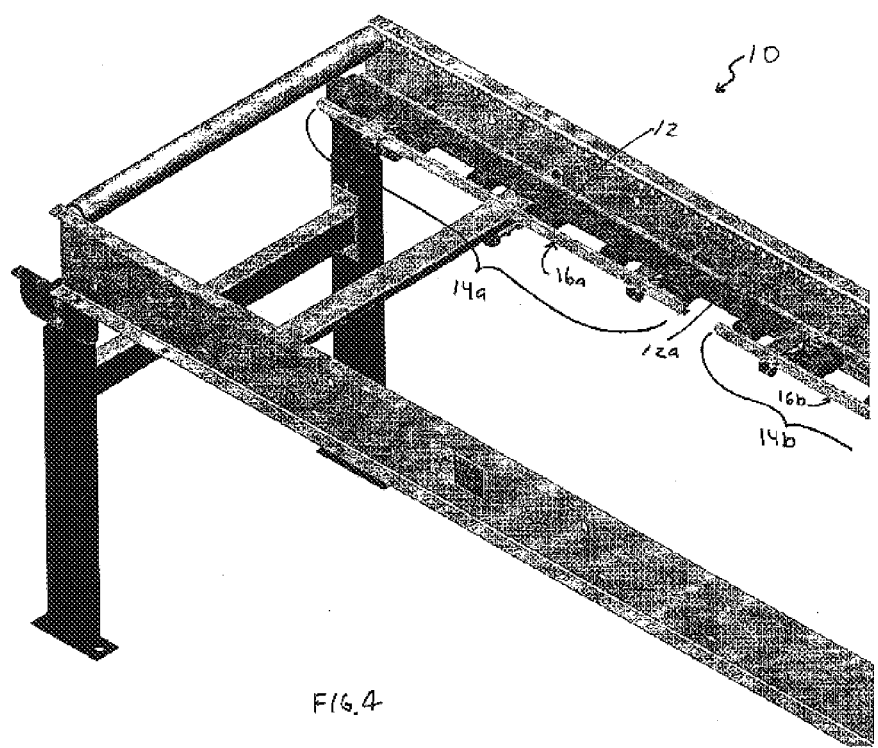
FIG. 4 is a top perspective view of zone 14a and a portion of zone 14b of the accumulation conveyor section shown in FIG. 3.
Figure 5:
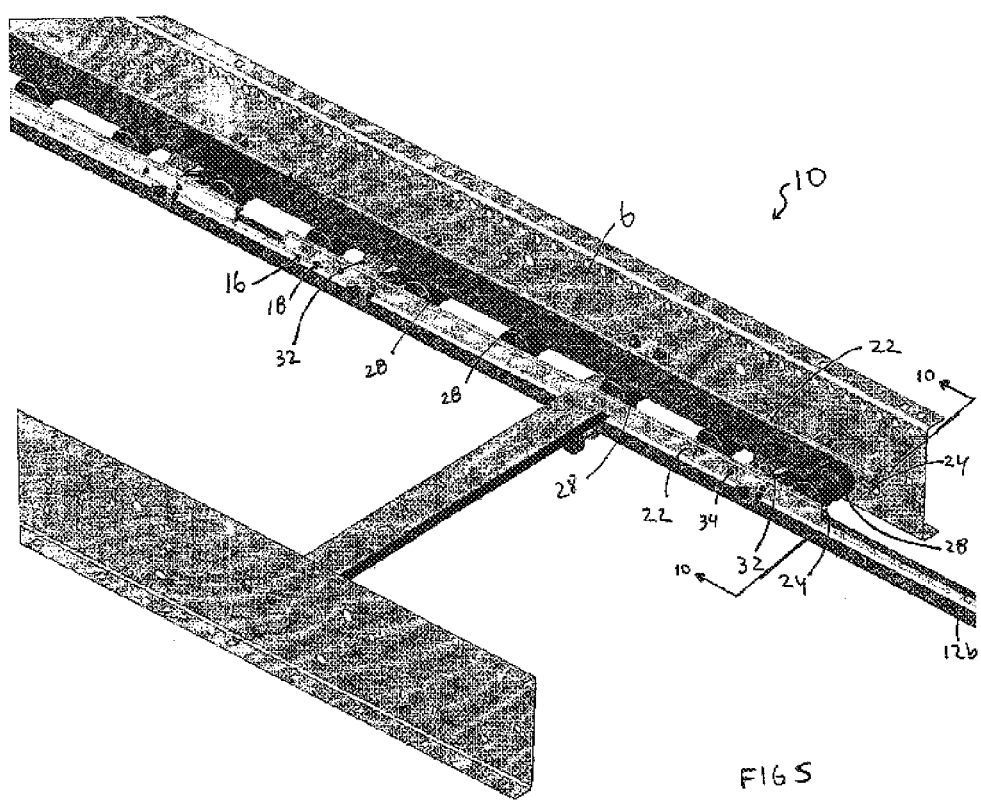
FIG. 5 is a top perspective view of zone 14d and a portion of zone 14c of the accumulation conveyor section shown in FIG. 3, with the support legs omitted.
Figure 6:
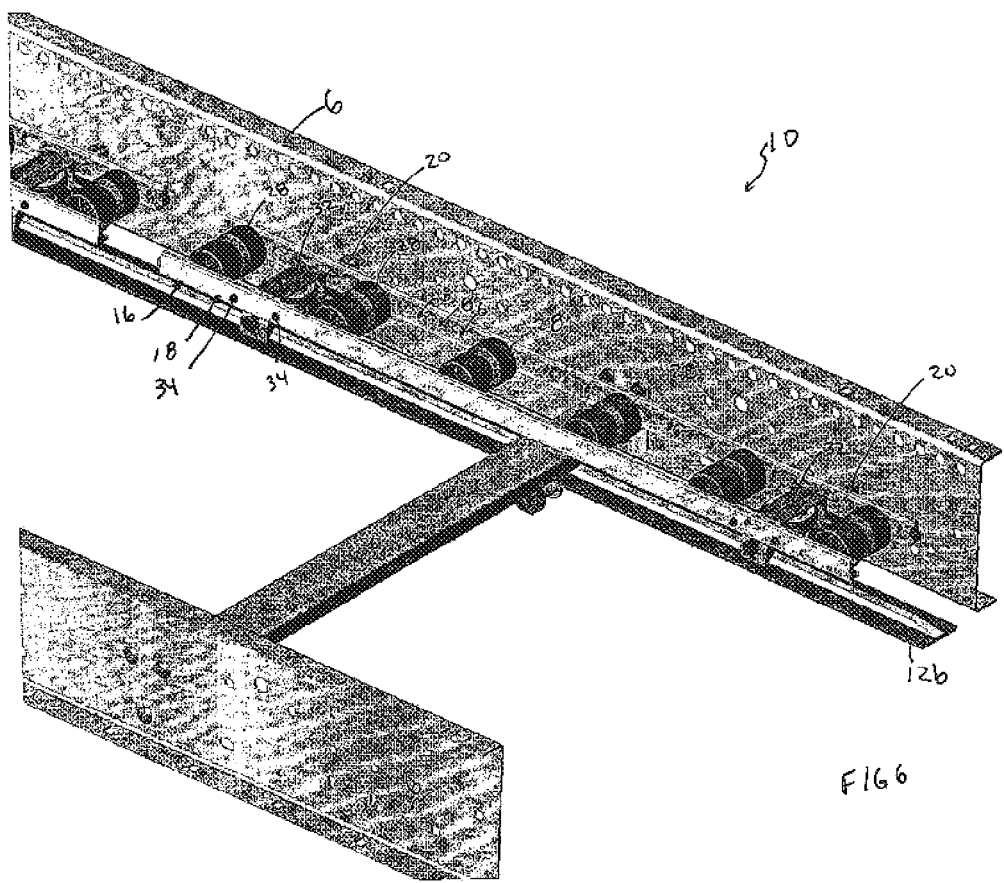
FIG. 6 is top perspective view of zone 14d a similar to FIG. 5, with the top run of the drive belt omitted.
Figure 7:
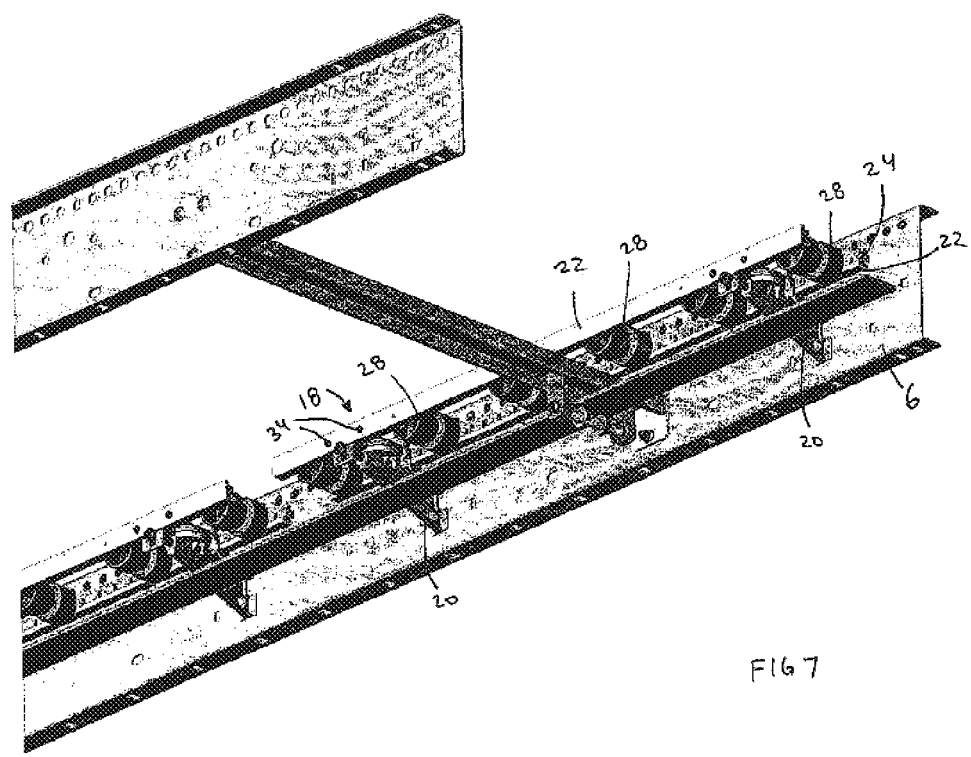
FIG. 7 is a bottom perspective view of a portion of zone 14d.

Referring to FIGS. 3 and 4, there is shown a section 10 of the accumulation conveyor portion shown in FIGS. 1 and 2. With reference also to FIG. 4, section 10 is shown including a portion of drive belt 12 which is a single, endless belt within the portion of the accumulation conveyor 2 driven by a single power source. Drive belt 12 includes upper run 12a, of which a portion is, upon actuation of a zone urged into driving contact with the lower tangent edge of the rollers 8 in that zone, and lower run (not seen), which is the lower, return portion of the endless drive belt 12. Additional accumulation sections may be attached to either end of section 10 to form a single power source, single drive belt accumulation conveyor having the desired overall length and number of controlled zones.

As seen in FIGS. 3 and 4, accumulation conveyor section 10 comprises a plurality of individually controllable zones 14, identified in FIG. 3 as individual zones 14a, 14b, 14c and 14d. Each zone is defined by a respective actuator assembly 16, identified in FIG. 3 as 16a, 16b, 16c and 16d, each of which is controllable independent of the other actuator assemblies, making each zone individually controllable. Although the length of a zone may vary, in the embodiment depicted, the zones were 36 inches long.

Referring to FIGS. 5, 6, 7, 8 and 9, various views and portions of an actuator assembly 16 are shown. As depicted, actuator assembly 16 includes an accumulator shoe assembly 18 supported by two or more shoe support brackets 20 extending from frame side 6. Each accumulator shoe assembly 18 includes two spaced apart shoe frame members 22 which carry respective axle retainers 24. In the depicted embodiment, frame members 22 are made of aluminum, although any sufficiently rigid material may be used. Each axle retainer 24 includes a plurality of preferably uniformly spaced axle receiving slots 26. Accumulator shoe assembly 18 further includes a plurality of spaced apart pressure rollers 28, rotatably supported by respective pressure roller axles 30. Pressure roller axles 30 are received by axle receiving slots 26, which have an entrance 26a which lead to a larger opening 26b shaped complementary to the ends of the pressure roller axles 30. Preferably, but not absolutely, pressure roller axles 30 do not rotate. Axle retainer 24 is made of Santoprene®, although any suitably flexible/elastic material may be used, which permits entrance 26a, which is slightly smaller than the diameter of the end of the pressure roller axle 30, to flex sufficiently to allow the axle end to pass therethrough into opening 26b, which engages the axle end sufficiently to keep the pressure roller axle 30 retained.

In the depicted embodiment, axle receiving slots 26 have the same spacing as the openings in the frame sides 6 that receive the conveyor roller 8 axles, and are aligned therewith. The plurality of axle receiving slots 26 provides a modular, adjustable accumulation shoe which can easily be field fit to the exact configuration required. For example, with conveying rollers 8 disposed on three inch centers, a pressure roller assembly is disposed in-between respective pairs of conveying rollers 8, one inch off center from one of the two conveying rollers 8 and two inches off center from the other. If the conveying rollers 8 are disposed on two inch centers, the pressure rollers 28 are disposed one inch off center of each of the pair of conveying rollers 8. In the depicted embodiment, one pressure roller assembly is used for each pair of conveying rollers 8.

Shoe frame members 22 are supported in their spaced apart, generally parallel relationship by two spaced apart members 32, also known as a shoe spreader. Shoe spreader 32 includes two pairs of spaced apart extensions 32a (see FIG. 15) which extend in opposite directions and engage a respective axle receiving slot 26 as seen best in FIG. 8. Shoe frame members 22 are secured to shoe spreader 32 by self taping screws 34 which are threaded into extension 32a. Of course, any appropriate fastening and support structure may be used.

Figure 8:
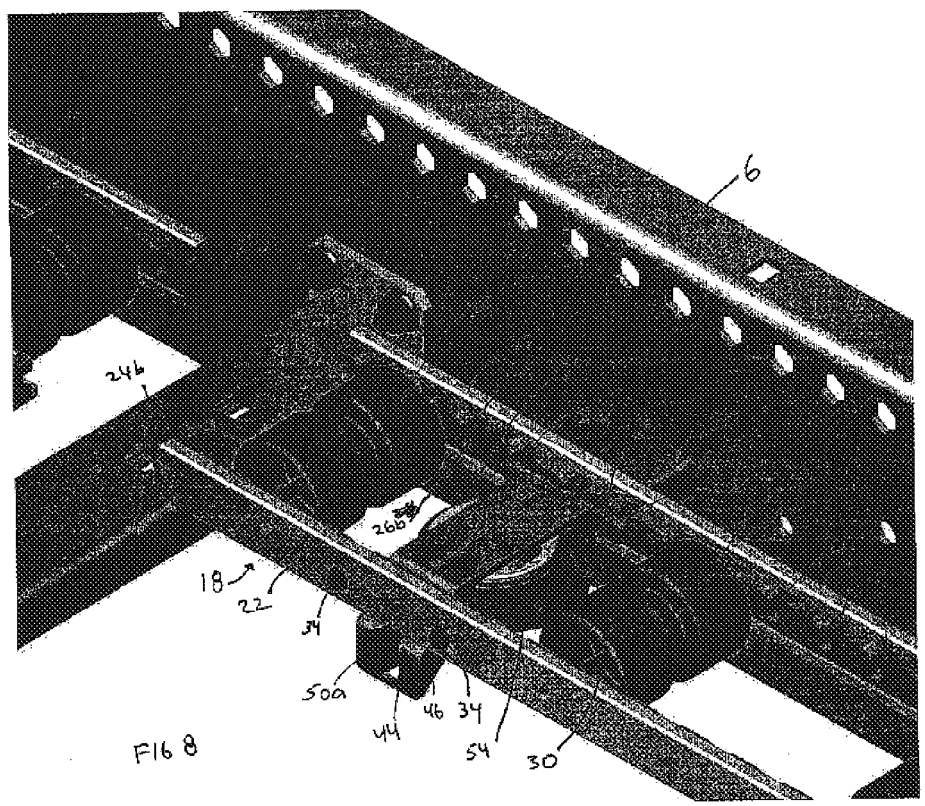
FIG. 8 is a close up top perspective view of one end of zone 14c, showing the details of the actuator including the shoe support bracket and shoe spreader, with the top and bottom run of the drive belt omitted.
Figure 9:
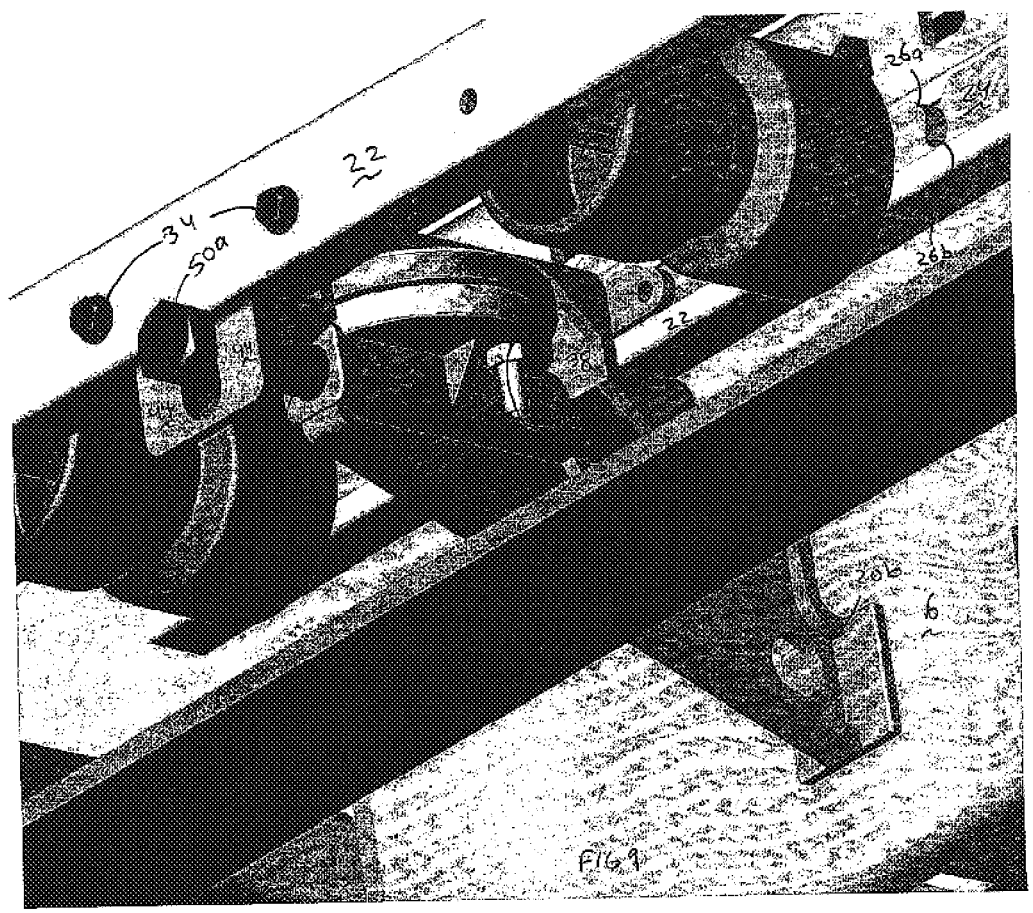
FIG. 9 is a close up bottom perspective view of one end of zone 14d showing the details of the actuator including the shoe support bracket and shoe spreader.

As seen in FIG. 8 and 15, shoe spreader 32 has a central web member 36 from which respective vertical walls 38 depend. Gussets 40 provide structural rigidity between walls 38 and web 36. Each vertical wall 38 includes a respective horizontally extending wall 42 which terminates in a downwardly extending vertical guide portion 44. Gussets 46 provide structural rigidity between horizontal wall 42 and guide portion 44. Horizontal extending wall 42 and guide portion 44 includes a guide slot or track 48.

Figure 11:
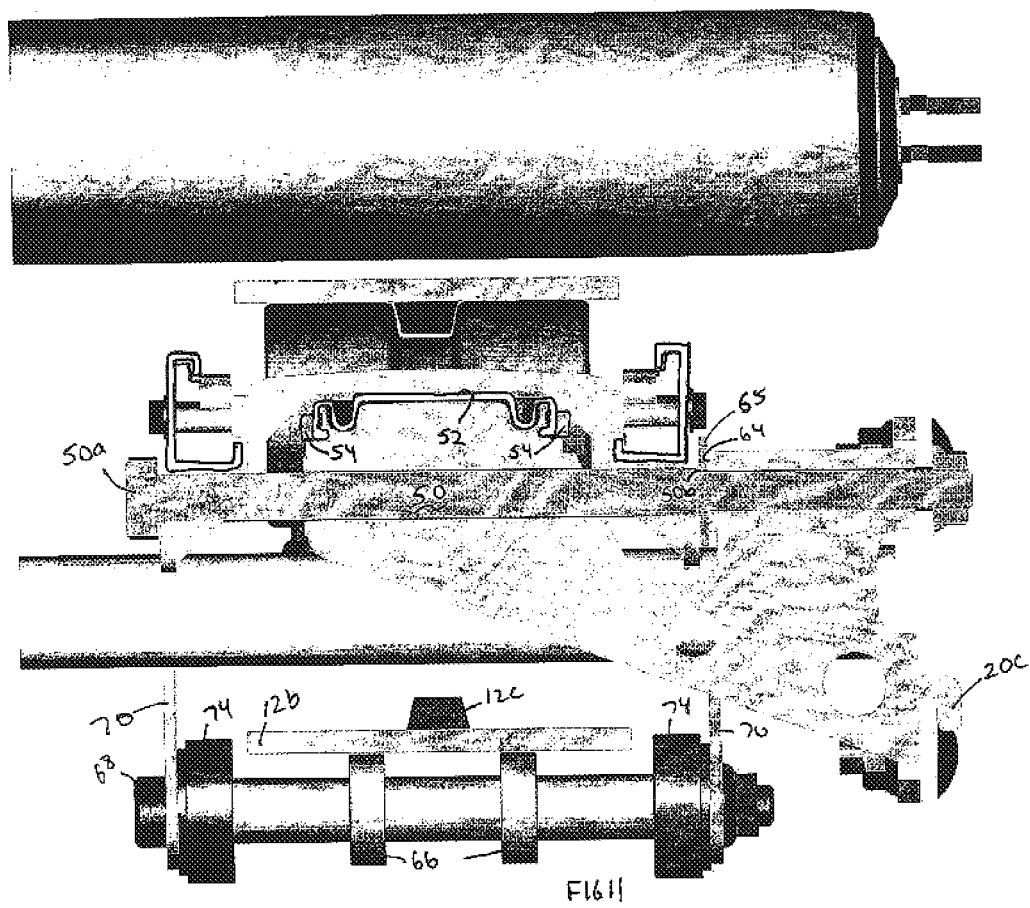
FIG. 11 is a cross-sectional view taken in zone 14d through the shoe support bracket and shoe spreader in the disengaged position.
Figure 12:
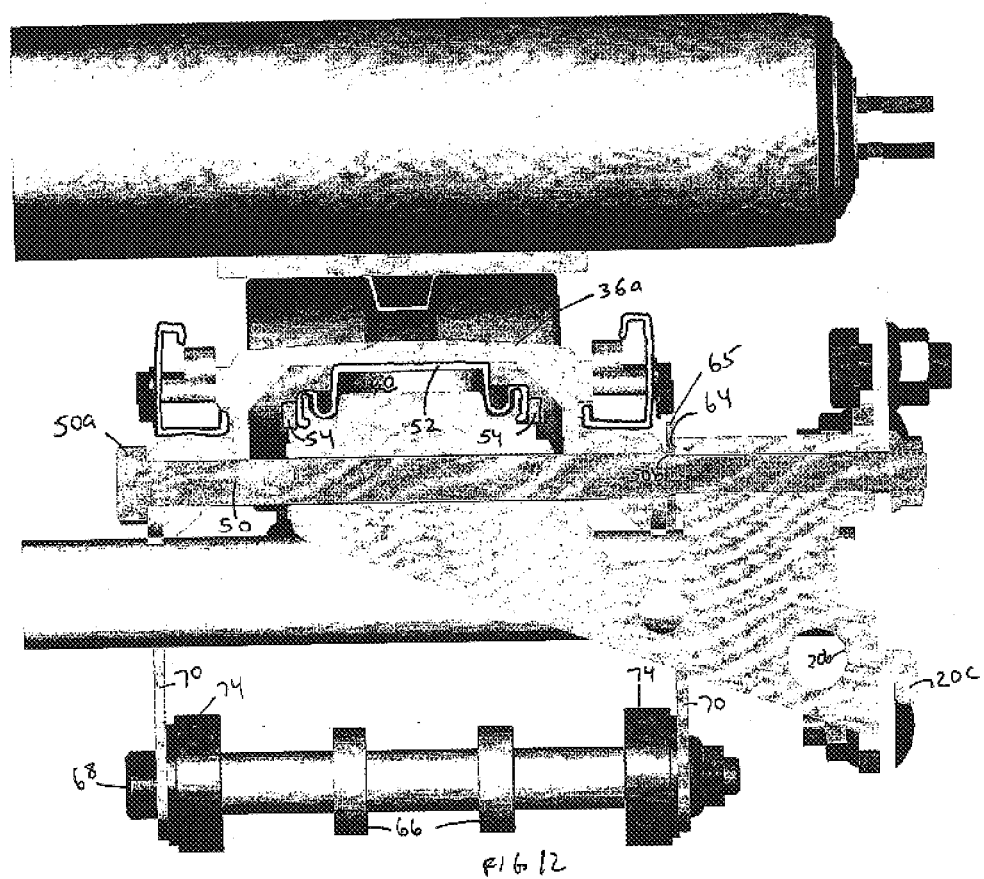
FIG. 12 is a similar view as FIG. 11 with the drive belt engaging the lower surface of the conveying rollers, but without the diaphragm not extended.
Figure 13:
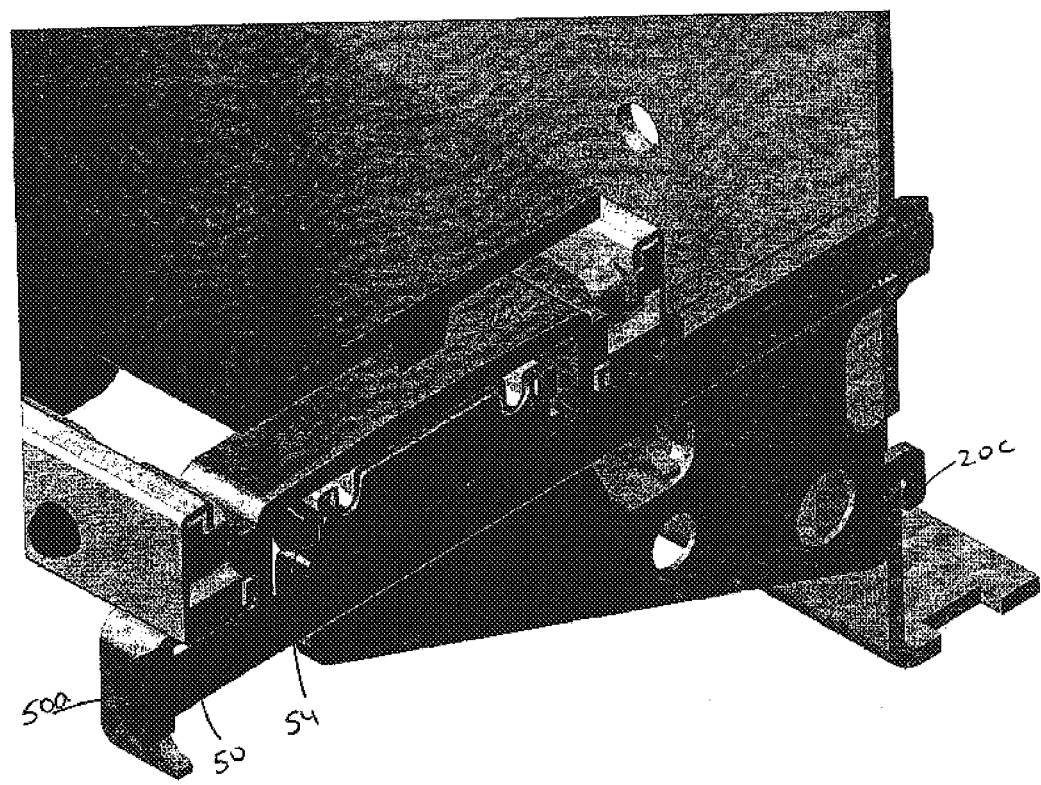
FIG. 13 is a cross-sectional top perspective view taken through the shoe support bracket and shoe spreader similar to FIG. 12.
Figure 19:
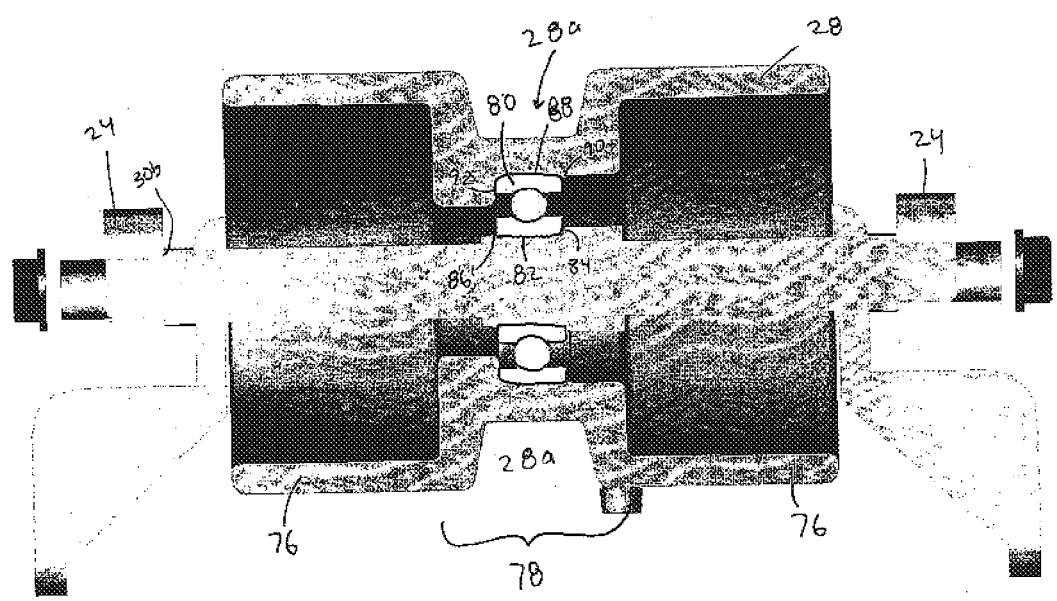
FIG. 19 is a cross-sectional view taken through the center of the pressure roller assembly.
Figure 20:
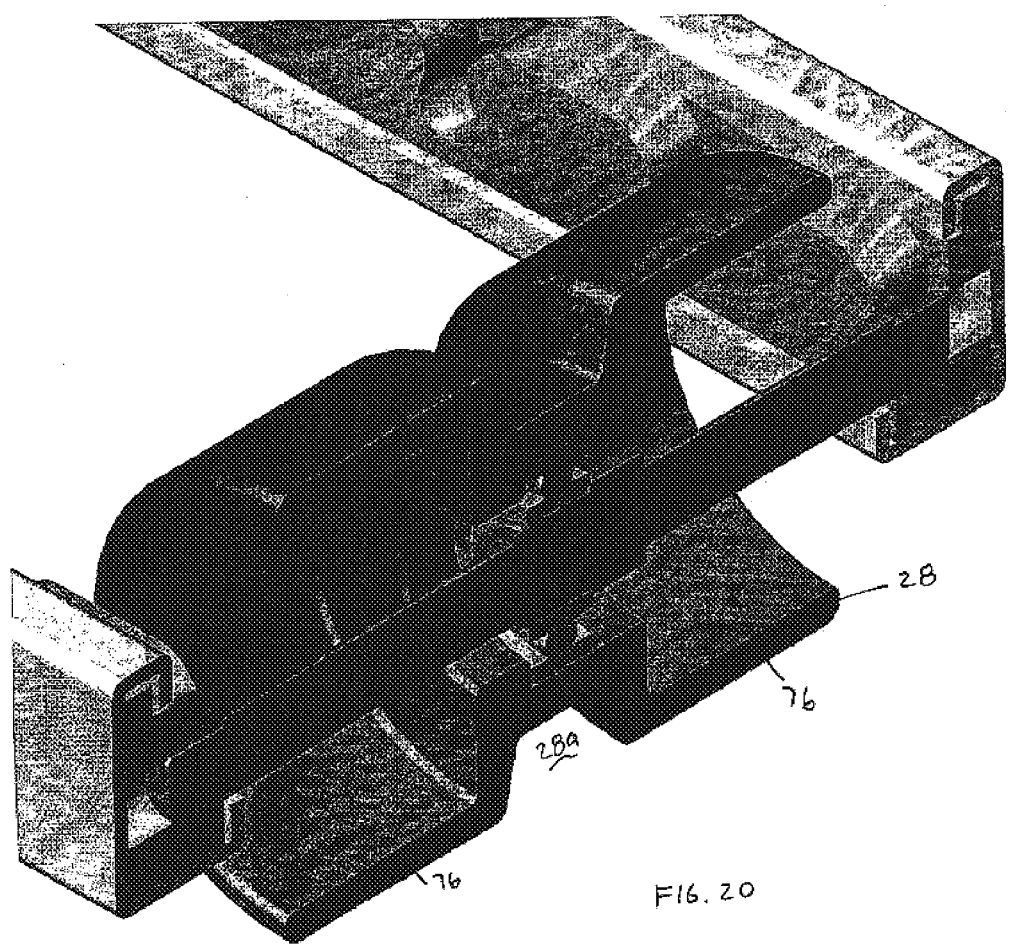
FIG. 20 is a cross-sectional top perspective view taken through the center of the pressure roller assembly.

Referring to FIGS. 8, 11 and 13, in the retracted, non-actuated position, shoe spreader 32 is supported by the top of diaphragm 52. Central member 36 overlies flexible diaphragm 52 which is secured by ring 54 to the annular wall 56 (see also FIG. 14) of shoe support bracket 20. As seen in FIGS. 11, 12 and 13, central member 36 includes a stiffening rib 36a extending upwards therefrom. Stiffening rib 36a may be omitted if central web 36 is sufficiently rigid without it.

Flexible diaphragm 52 forms an internal cavity 60. Dome 20a reduces the internal volume of internal cavity 60. Internal cavity 60 is in fluid communication with port 62 (see FIG. 9), into which an appropriate fitting 63 is connected, which is in turn connected to tubing (not shown) which can be routed through any of openings 20b in shoe support bracket 20. The internal cavity 60 is selectively connected to a source of pneumatic pressure when the accumulator shoe assembly 18 is to be moved upward to urge top run 12a of drive belt 12 into driving contact with the conveyor rollers 8 by pressure rollers 28, as seen in FIG. 12. When pressure is delivered to internal cavity 60 of both spaced apart shoe support brackets 20, flexible diaphragm 52 pushes against central web 36, moving shoe spreader 32 and accumulator shoe assembly 18 upwardly.

Guide pin 50 includes head 50a which functions to locate and retain one of the vertical guide portions 44. Shoe support bracket 20 includes a retention surface 64 against which is disposed spacer 65 which functions to locate and retain the other of the vertical guide portions 44. Retention surface 64 is also engaged by the shoulder 50b of guide pin 50, which functions to secure shoe support bracket 20 to frame side 6. The vertical portion 48b of the guide track 48 guides the shoe spreader 32 during vertical movement.

Shoe support bracket 20 as shown in FIGS. 11, 12 and 13 includes a hook shaped extension 20c which extends through an opening in side member 6 and engages the outer surface thereof. Alternatively, the extension may have any suitable shape, such as a round protrusion, to retain the lower portion of shoe support bracket 20.

Figure 10:
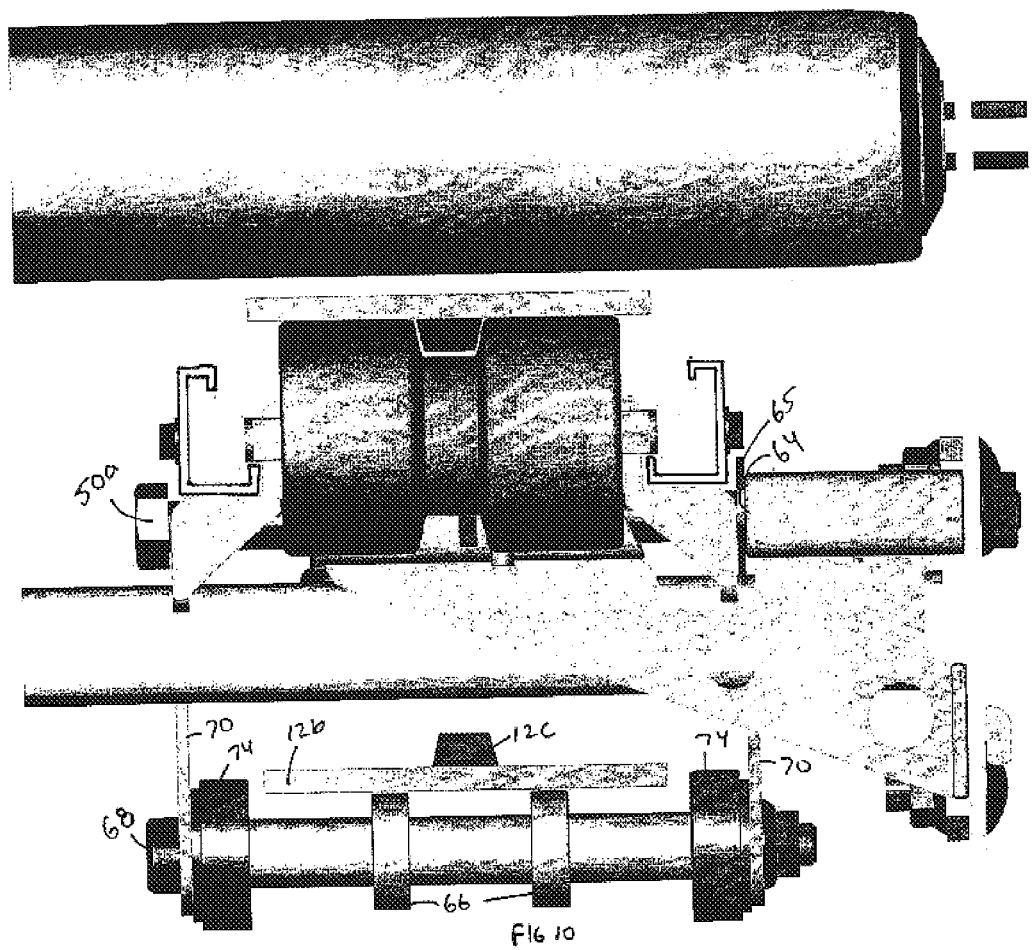
FIG. 10 is a side view taken at line 10—10 of FIG. 5, showing a section through the drive belt, and side views of the other components.

As seen in FIGS. 10, 11, and 12, lower run 12b is supported by a pair of spaced apart bearings 66, supported by shaft 68 by bracket 70 depending downwardly from frame cross member 72. Shaft 68 also supports a larger pair of spaced apart bearings 74 with outer diameters sufficiently large enough to retain lower run 12b on the sides, providing rolling action when contacted thereby. Both pairs of bearings are precision bearings to reduce noise.

Drive belt 12 includes a centrally located rib 12c which is shaped complementarily to the notch 28a in pressure roller 28, with adequate root and side clearance as may be needed for proper tracking. Rib 12c may be affixed to drive belt 12 in any suitable manner, such as lamination. Of course, if possible to manufacture, rib 12c can be of unitary construction with drive belt 12. Rib 12c can also be of any profile or configuration suitable for maintaining the desired position of drive belt 12. In the depicted embodiment, for example, drive belt 12 is two inches wide, with the pressure roller 28 extending about three-eighths of an inch beyond on either side, although any suitable belt and roller widths may be used. Drive belt is made from typical know materials for drive belts. In the depicted embodiment, in the non-actuated position, the upper surface of drive belt 12 is about three sixteenths of an inch from the lower surface of conveying rollers 8, minimizing the necessary travel of diaphragm 52.

Referring to FIGS. 16, 17, 19 and 20, pressure roller 28 is shown formed as a pair of generally hollow cylindrical walls 76 extending in opposite directions from a central hub 78 including a reduced diameter. The generally hollow cylindrical walls 76 reduce the mass of pressure rollers 28. In the depicted embodiment, pressure roller 28 is made of Delrin®, although any other suitable material may be used which provides sufficient rigidity. Central hub 78 includes circumferential notch 28a which receives rib 12c. Pressure roller 28 is rotatably supported by pressure roller axle 30 by bearing 80. Pressure roller axle 30 includes a diameter 82 for receiving the inner race of bearing 80, with step 84 and rib 86 locating bearing 80. The inner surface of central hub 78 includes diameter 88 for receiving the outer diameter of bearing 80, and rib 90 for retaining bearing 80 against locating surface 92.

Ends 30a of pressure roller axle 30 each include a larger diameter locating shoulder 30b which locate adjacent each respective axle retainer 24 to locate pressure roller axle 30 there-between.

The accumulator shoe assembly 18 of actuator assembly 16 provides significant flexibility for sizing the shoe assembly, as well as allows easy modifications to be made in the field. For example, the length of accumulator shoe assembly 18 may be easily adjusted by cutting it down to the desired length. The multiple openings for holding the pressure roller axle provide significant flexibility to accommodate various conveying roller spacing. As seen in FIG. 18, one end of axle retainer 24 includes a dove tail notch 24a. As can be seen in FIG. 8, at an opposite end of axle retainer 24 is a complementarily shaped dove tail 24b, allowing sections of axle retainer 24 to be interconnected.

When accumulator shoe assembly 18 is actuated, it is translated linearly upwardly to urge pressure rollers 28 against top run 12a of belt 12, urging run 12a into driving engagement with rollers 8 sufficiently to provide positive drive to every roller 8. Shoe spreader 32 carries the load, there being no metal to metal contact between any moving parts. Axle 30 is isolated by axle retainer 24 from shoe frame members 22.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted with a regular utility application based on this provisional application.

What is claimed is:

1. An accumulator actuator for an accumulation conveyor, said conveyor having two spaced apart conveyor frame members, a plurality of spaced apart conveyor rollers carried by said frame members and defining an upper conveying surface, an endless drive belt underlying said drive rollers, said accumulator actuator comprising:
   a) a pair of spaced apart frame members, each of said frame members carrying a respective axle retainer, each said axle retainer comprising a plurality of openings configured to receive a respective axle end, each of said openings of a respective axle retainer being spaced apart a predetermined distance, each of said openings being generally aligned with a respective opening of said axle retainer carried by the other of the pair of frame members;
   b) at least one spreader member connected to each of said frame members, said at least one member maintaining said frame members in said spaced apart relationship;
   c) a plurality of pressure rollers rotatably carried on a respective axle, each end of said respective axle being supported by a respective axle retainer;
   d) at least one support carried by one of said conveyor frame members, each said at least one support including a flexible diaphragm defining an interior cavity, said interior cavity being selectively connectable to a source of fluid pressure;
   each of said one spreader member being supported and guided for generally vertical linear movement by a respective one of said at least one support, said diaphragm of said respective one of said at least one support being in operable contact with said spreader member such that when said diaphragm is actuated by connecting it to a source of fluid pressure, said spaced apart frame members urge said pressure rollers against said drive belt, thereby urging said drive belt against said conveyor rollers.

* * * * *